United States Patent [19]
Miyano

[11] Patent Number: 6,038,507
[45] Date of Patent: *Mar. 14, 2000

[54] DRIVING SIMULATION APPARATUS CAPABLE OF ARBITRARILY SETTING START POSITION AND METHOD THEREOF

[75] Inventor: Kazuhiko Miyano, Akashi, Japan

[73] Assignee: Fujitsu Ten Limited, Kobe, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,903

[22] Filed: Jul. 25, 1996

[30] Foreign Application Priority Data

Jul. 26, 1995 [JP] Japan .................................. 7-190547

[51] Int. Cl.⁷ .............................................. G06F 165/00
[52] U.S. Cl. .......................... 701/202; 701/209; 701/210; 340/990; 340/995
[58] Field of Search ................................... 701/200, 202, 701/208, 209, 210, 211, 212; 73/178 R; 340/988, 990, 995

[56] References Cited

U.S. PATENT DOCUMENTS

| | | | |
|---|---|---|---|
| 4,608,656 | 8/1986 | Tanaka et al. .......................... | 701/212 |
| 5,212,643 | 5/1993 | Yoshida .................................... | 701/212 |
| 5,544,060 | 8/1996 | Fujii et al. .............................. | 340/990 |
| 5,612,881 | 3/1997 | Moroto et al. .......................... | 701/209 |
| 5,777,875 | 7/1998 | Miyano .................................... | 701/211 |
| 5,787,383 | 7/1998 | Moroto et al. .......................... | 701/210 |

FOREIGN PATENT DOCUMENTS

5-323872 12/1993 Japan .
7-114696 5/1995 Japan .

Primary Examiner—Gary Chin
Attorney, Agent, or Firm—Staas & Halsey LLP

[57] ABSTRACT

In a driving simulation apparatus for retrieving a map on the basis of digital map data obtained by digitizing a road network, displaying the route so retrieved on a display unit and executing simulation driving while tracing the route displayed on the display unit, a portion for calculating the position closest to the position of a scroll cursor and a portion for setting the position on the route obtained as a result of this calculation to the start position of driving simulation are provided. When simulation is started, the cursor is moved to a position near a desired start position on the route. When the operation is thereafter started, simulation is started from the desired start point.

9 Claims, 13 Drawing Sheets

DRIVING SIMULATION APPARATUS CAPABLE OF ARBITRARILY SETTING START POSITION AND METHOD THEREOF

BACKGROUND OF THE INVENTION

1. Field of the Invention

Regarding so-called "navigation apparatuses", the present invention relates to a driving simulation apparatus for executing simulation driving by tracing the result of route retrieval, and capable of rehearsing route guidance before driving is actually done.

2. Description of the Related Art

A so-called "navigation apparatus" is known which retrieves a route on the basis of digital map data obtained by digitizing a road network and displays the route so retrieved on a display unit. A driving simulation device is also known which displays the result of route retrieval in this navigation apparatus on a display unit and executes simulation driving by tracing the route without acturally driving a car.

In the driving simulation apparatus according to the prior art, a start point of a route or a point at which simulation is interrupted previously can be set as the point at which driving simulation is started. When driving simulation is interrupted halfway, this interruption position is stored so that the next simulation can be started from this interruption position.

In the driving simulation apparatus according to the prior art, however, simulation must be started either from the start point or the interruption point described above, and cannot be started from other points.

When, for example, a complicated route exists and surroundings of this route must be repeatedly simulated in such an apparatus, simulation must be started from the start point each time and must then advance to the target point.

SUMMARY OF THE INVENTION

It is therefore an object of the present invention to provide a driving simulation apparatus capable of starting simulation from an arbitrary point.

In a driving simulation apparatus which executes route retrieval on the basis of digital map data obtained by digitizing a road network, displays the route so retrieved on a display unit, conducts simulation driving while tracing the route displayed on the display unit and scrolls the map, the object of the present invention described above can be accomplished by calculating the position on a route, which is the nearest to the position of a scroll cursor on the display unit, and setting the position on the route obtained by this calculation to the start position of driving simulation.

When simulation is started, the cursor is moved to a position near the desired start position on the route. When the operation is then started, simulation can be started from the desired start point.

In the present invention, further, when the cursor is set to a position spaced apart from a predetermined value from the route at the start of simulation, simulation can be started from the start points of all the routes. When simulation has been previously executed, simulation can be started, too, from the interruption point of a previous simulation.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Preferred embodiments of the present invention will be hereinafter explained with reference to the accompanying drawings.

Figure 1:
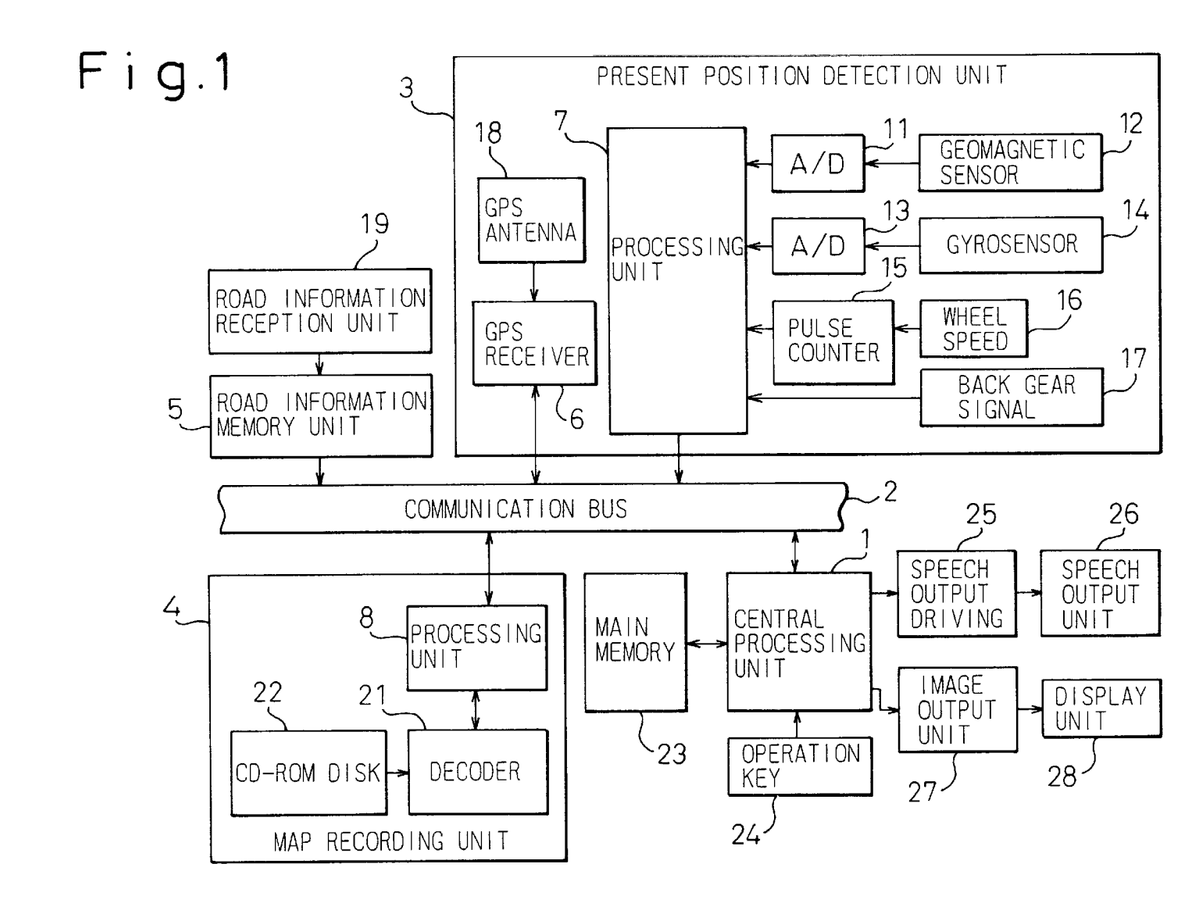
FIG. 1 is a circuit diagram of a navigation apparatus.

FIG. 1 is a structural view of a navigation apparatus.

In this drawing, reference numeral 1 denotes a central processing unit and reference numeral 2 denotes a communication bus. A present position detecting unit 3, a map recording unit 4 and a road information memory unit 5 are connected to this communication bus 2. In the present position detecting unit 3, a GPS receiver 6 and a processing unit 7 are connected to the communication bus 2. In the map recording unit 4, a processing unit 8 is connected to the communication bus 2.

A geomagnetic sensor 12 is connected to the processing unit 7 of the present position detecting unit 3 through an A/D converter 11, a gyrosensor 14 is connected to the processing unit 7 through an A/D converter 13, a wheel speed sensor 16 is connected to the processing unit 7 through a pulse counter 15 and furthermore, a back gear signal 17 is inputted to the processing unit 7. A GPS antenna 18 is connected to the GPS receiver 6.

A road information reception unit 19 is connected to the road information memory unit 5. A CD-ROM disk 22 is connected to the processing unit 8 of the map recording unit 4 through a decoder 21.

A main memory 23 that stores programs, data, etc., and an operation key 24 for the input operation are connected to the central processing unit 1. A speech output unit 26 is also connected to the central processing unit 1 through a speech output driving circuit 25, and a display unit 28 is connected through an image output unit 27.

Figure 2A:
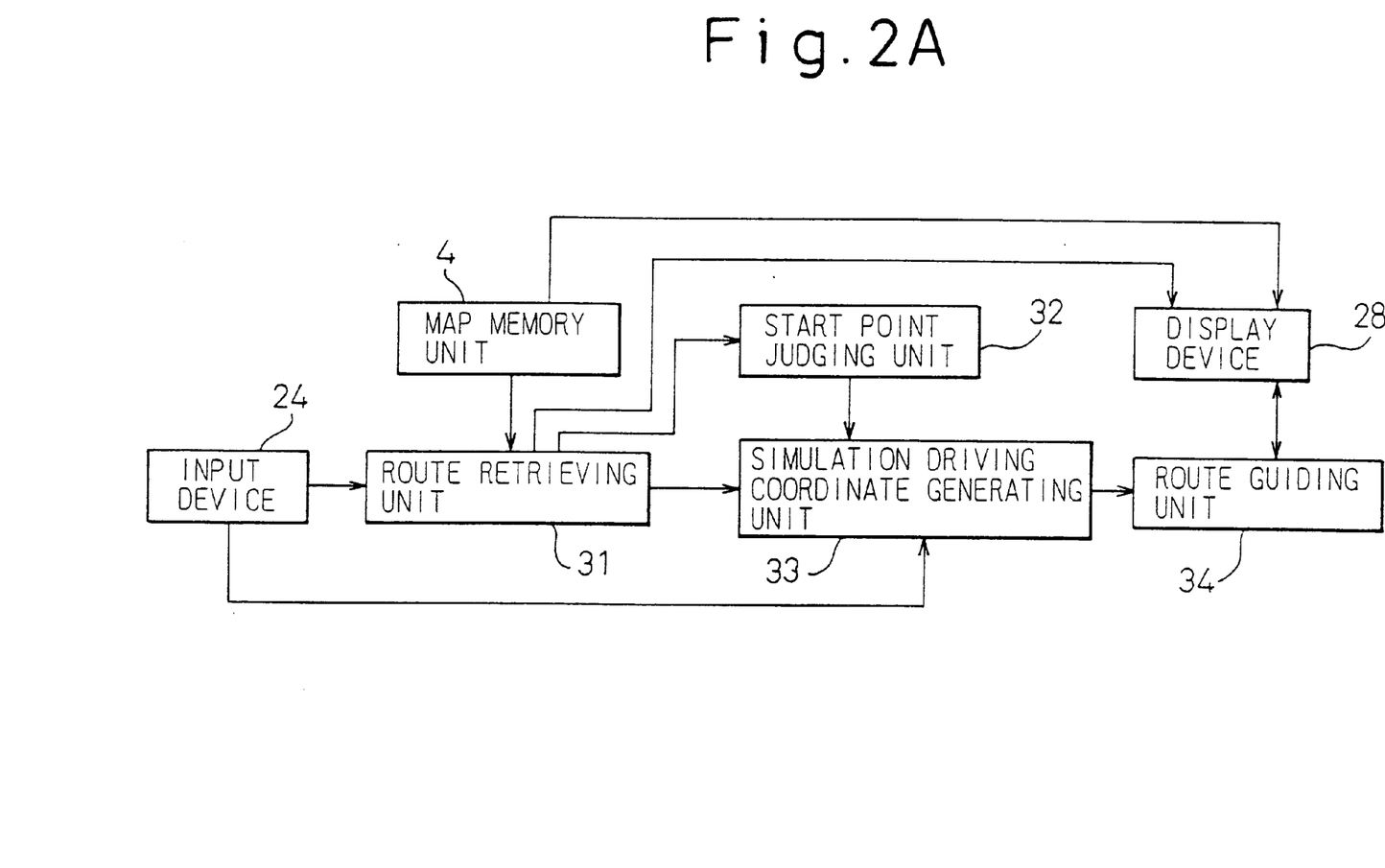
FIG. 2A is a circuit diagram showing an example of a driving simulation apparatus according to the present invention.

FIG. 2 is a block diagram of the driving simulation apparatus.

Reference numeral 24 denotes an input unit, which is also used as the operation key shown in FIG. 1. Reference numeral 4 denotes a map recording unit and reference numeral 8 denotes a display unit. These units 4 and 8 are the same as those shown in FIG. 1. Reference numerals 31 to 34 denote the members which are included in the central processing unit 1 shown in FIG. 1, that is, a route retrieving unit 31, a start point judging unit 32, a simulation driving coordinate generating unit 33 and a route guiding unit 34.

Figure 2B:
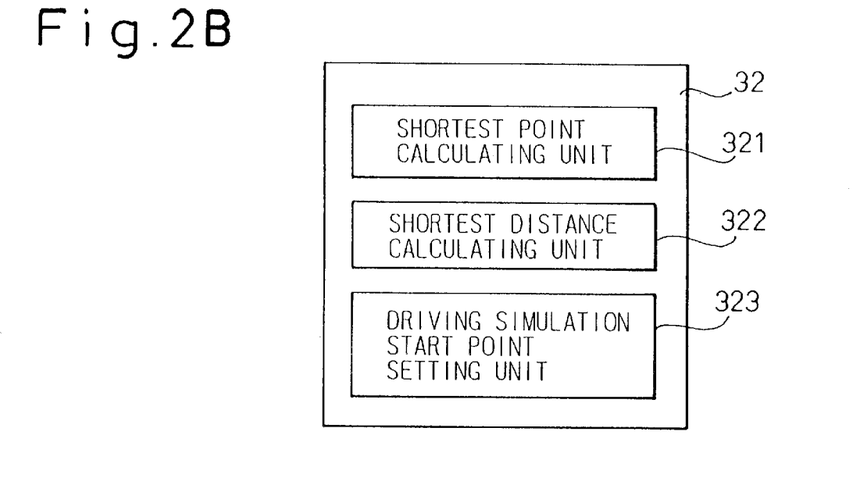
FIG. 2B shows constitution of a start point judging unit in FIG. 2A.
Figure 2C:
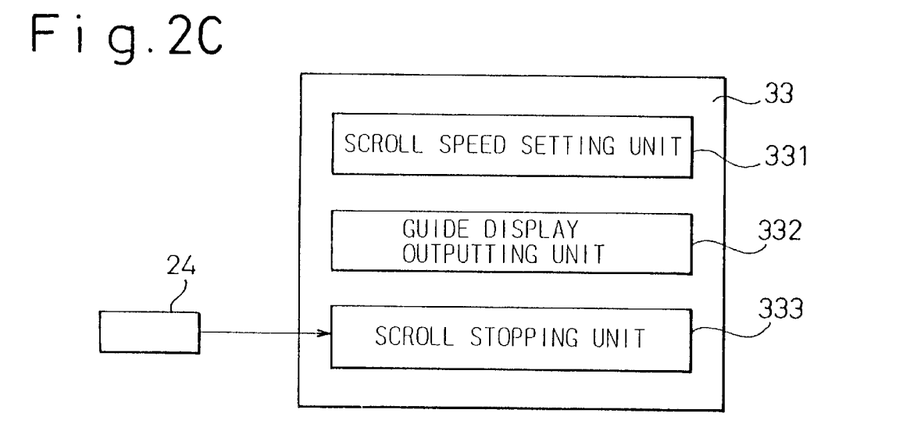
FIG. 2C shows constitution of a driving coordinate generating unit 33 in FIG. 2A.

The start point judging unit 32 includes a shortest distance point calculating unit 321, a shortest distance calculating unit 322 and a driving simulation start point setting unit 323 as shown in FIG. 2B. The simulation driving coordinate generating unit 33 includes a scroll speed setting unit 331, a guide display outputting unit 332 and a scroll stopping unit 333 as shown in FIG. 2C.

Next, the operation of the apparatus shown in FIG. 2A will be explained.

Setting of the start point and the goal or destination point, setting of manual scroll, if any, and inputting of the start/end of driving simulation are carried out by using the inputting unit 24.

The route retrieving unit 31 executes the shortest route retrieval such as obtaining the distance, time, etc., on the basis of the information between the start and the goal that is inputted from the inputting unit 24 and on the basis of the network information stored in the map recording unit 4.

Figure 3:
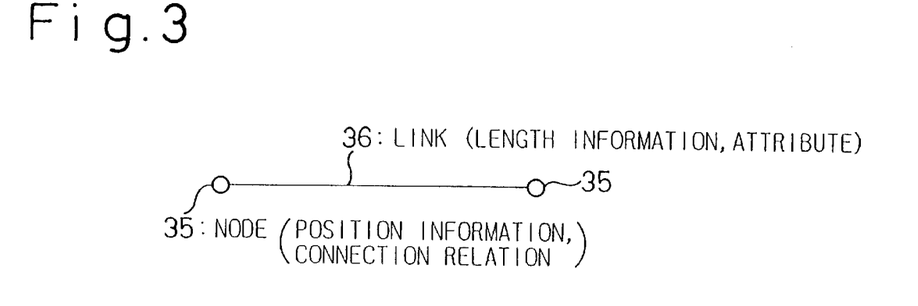
FIG. 3 is an explanatory view useful for explaining nodes and links.

As shown in FIG. 3, the map data stored in the map recording unit 4 and used for the route retrieval described above comprises a node having the position information and the connection information of the roads, and a link having the distance information between the nodes and attribute information.

Figure 4:
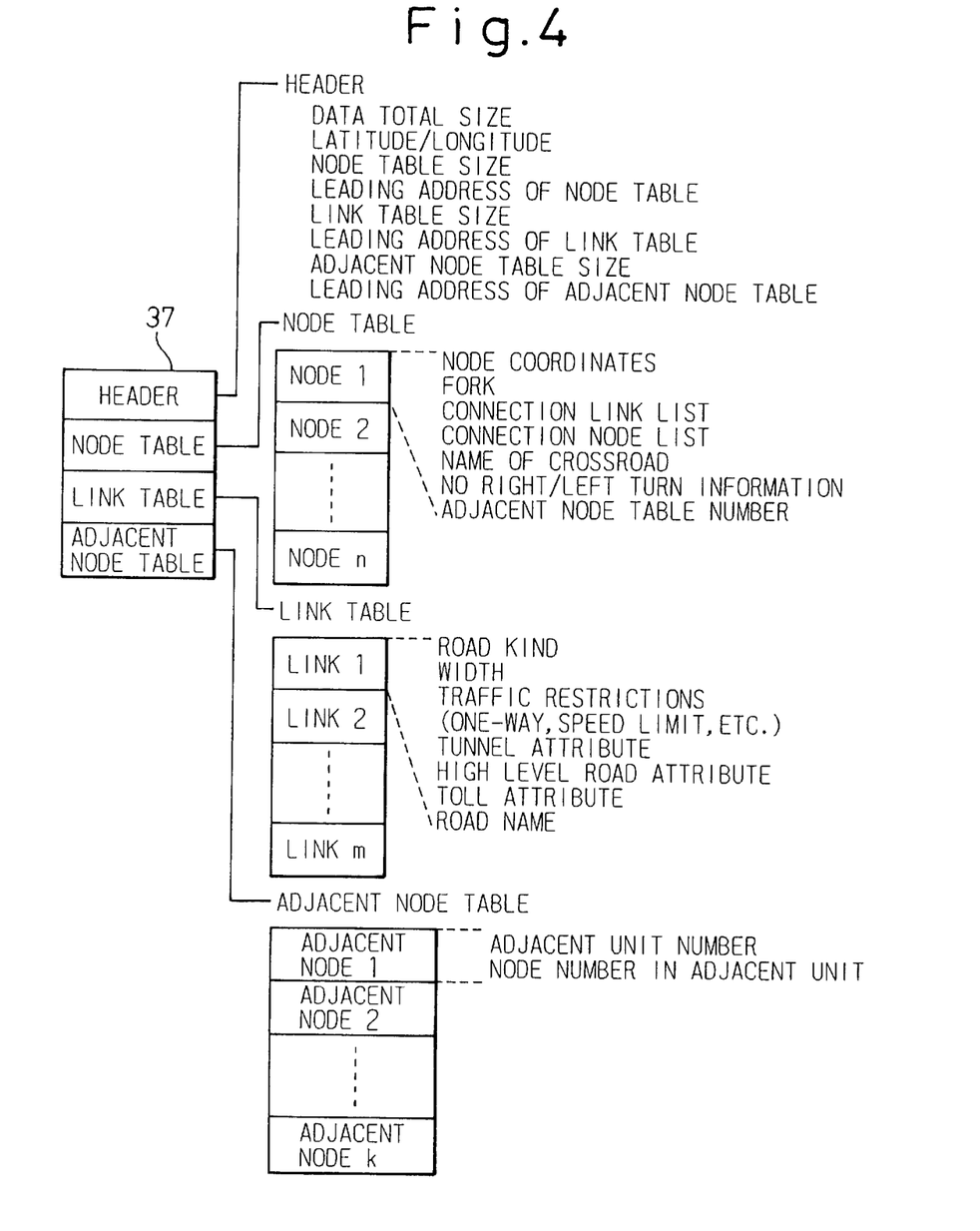
FIG. 4 shows an example of a road map data structure.

The format of the map data is shown in FIG. 4. The map data 37 includes a header, a node table, a link table and an adjacent node table as shown in FIG. 4. The content of the header and the content of each table are shown on the right-hand portion of the drawing.

Figure 5:
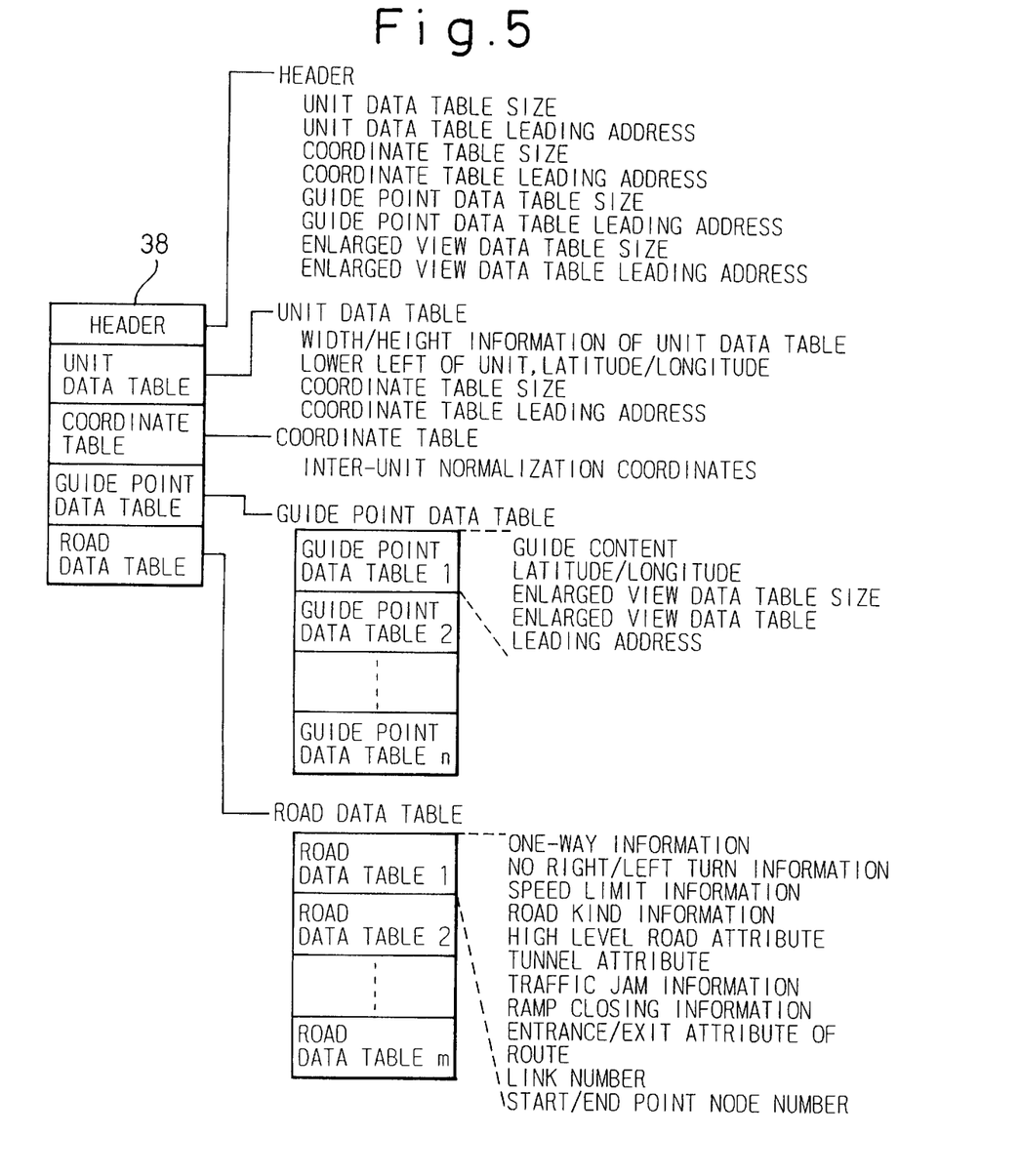
FIG. 5 shows an example of a data format as a result of retrieval.

FIG. 5 shows the data format obtained as a result of retrieval. The retrieval result data format 38 includes a header, a unit data table as the route information from the start to the goal, a coordinate table, a guide point data table as the guide information, and a road data table. The content of the header and that of each table are shown on the right-hand portion of the drawing.

Figure 6:
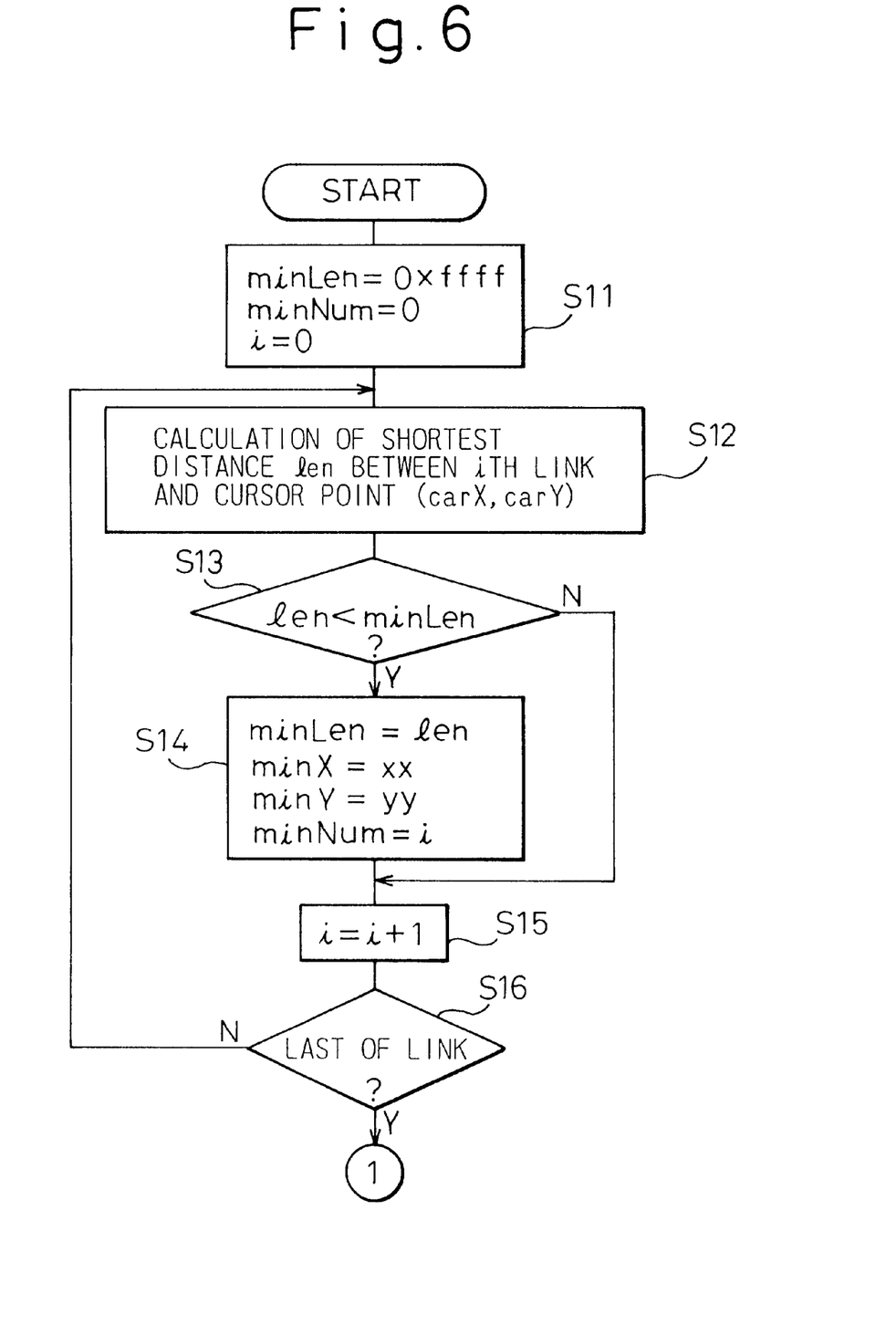
FIGS. 6 and 7 are flowcharts that together explain the processing operation for setting a simulation start point in a driving simulation apparatus according to the present invention.
Figure 7:
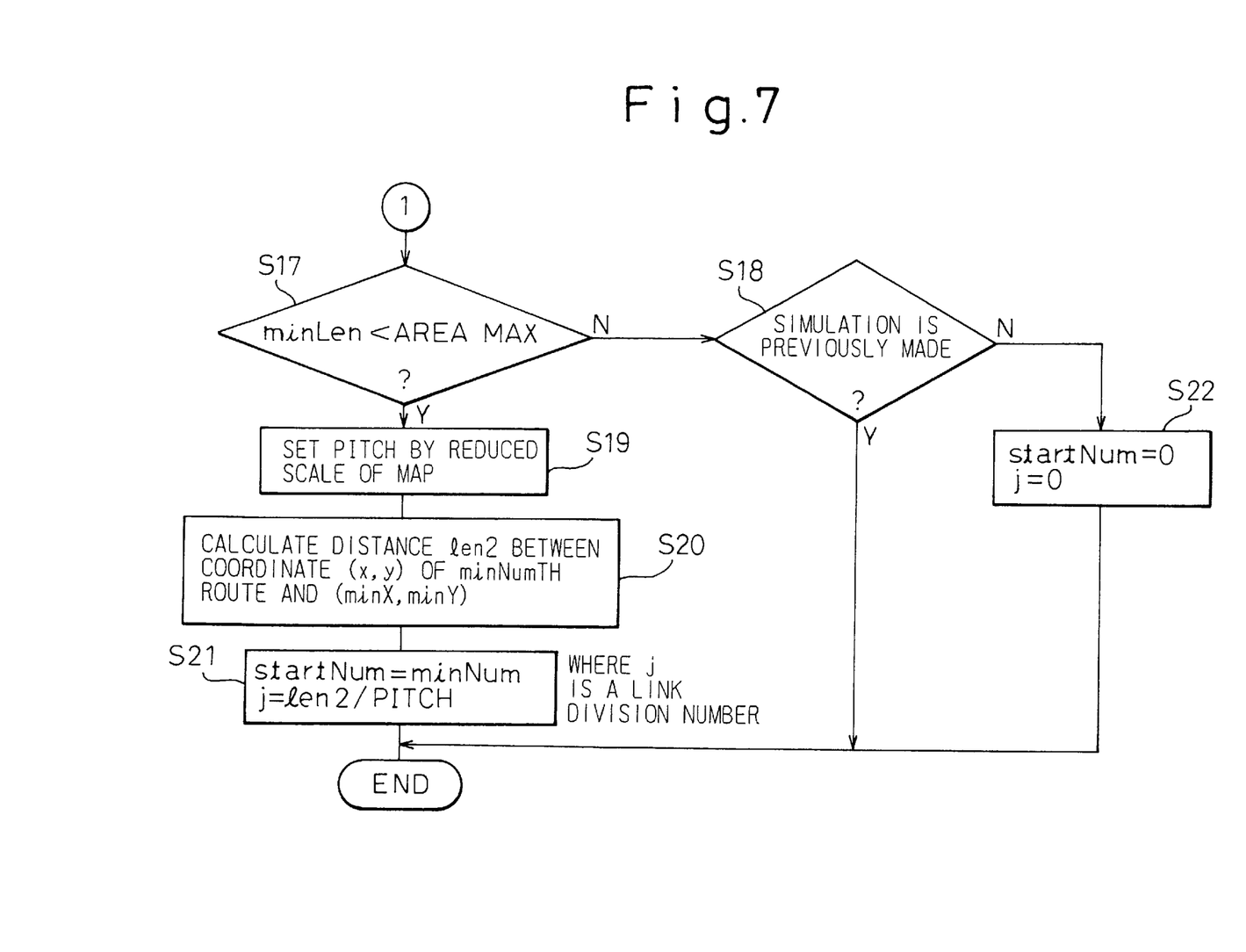

When route retrieval is completed, the route as the result of retrieval is displayed on the screen of the display unit 28 with the scroll cursor SC. Next, the start point judging unit 32 judges the start position of driving simulation. FIGS. 6 and 7 show the flowchart for this judgement.

Steps S11 to S16 determine the shortest distance between the scroll cursor SC and the links of all the routes, and decide the link number providing the shortest distance and its position.

At the step S11, the maximum numerical value 0xffff is set to a register minLen for storing the shortest distance, 0 is set to a register minNum for storing the number of the link of the shortest distance point, and 0 is set to a register i for storing the link number which is now being judged.

Figure 8A:
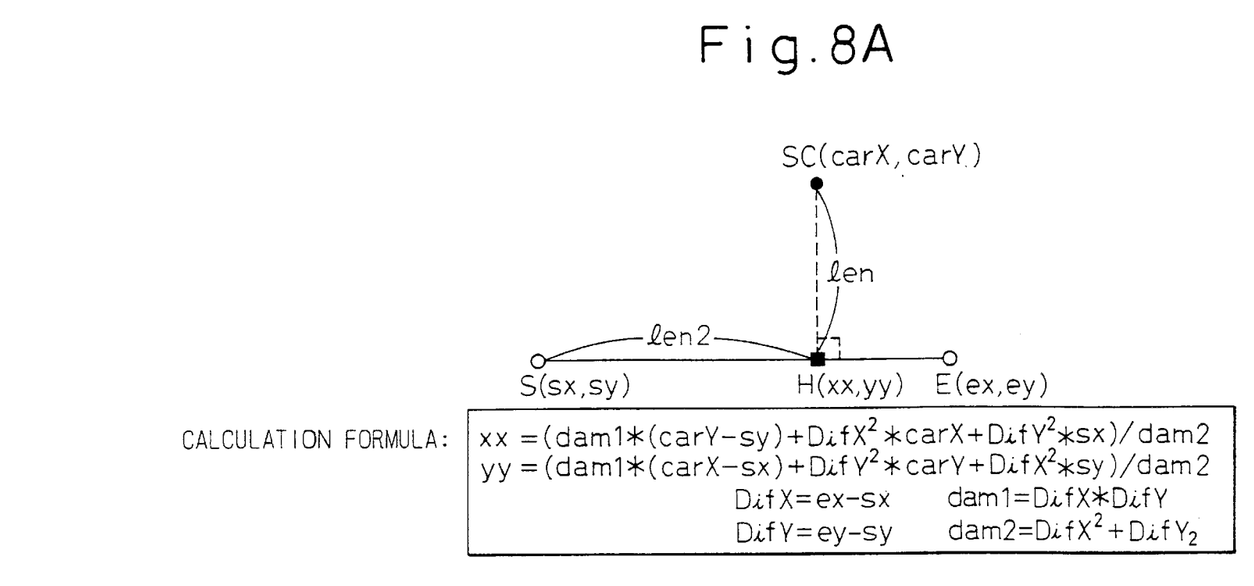
FIGS. 8A and 8B are explanatory views useful for explaining the calculation method of the shortest distance in the processing shown in FIGS. 6 and 7.
Figure 8B:
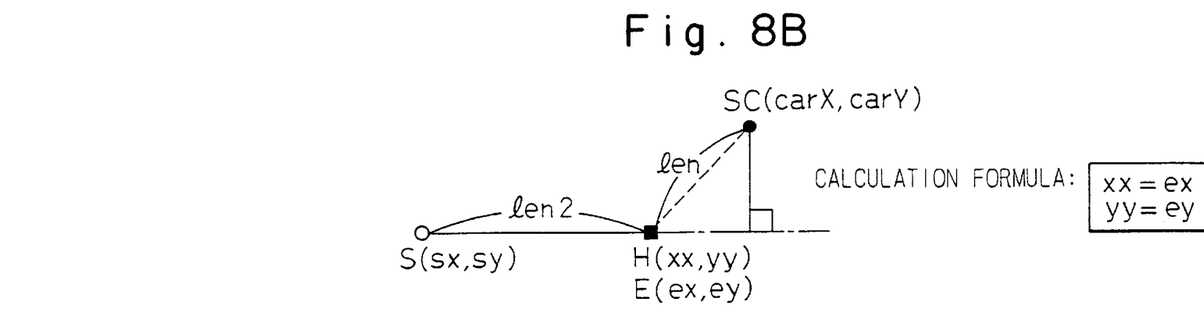

At the next step S12, the shortest distance len between the coordinates of the link having the number stored in the register i and the coordinates of the cursor SC. This calculation method is shown in FIGS. 8A and 8B. FIG. 8A represents the calculation method of the shortest distance point in the ordinary case, and FIG. 8B represents the calculation method of the case where the end point of the link is the shortest distance point. In the drawing, symbol SC represents the scroll cursor and its coordinates are (carX, carY). Symbol S represents the start point of the link and its coordinates are (sx, sy). Symbol E represents the end point of the link and its coordinates are (ex, ey). Symbol H represents the shortest distance point and its coordinates are (xx, yy). Symbol len represents the distance between the cursor SC and the shortest distance point H and len 2 represents the distance between the start point of the link S and the shortest distance point H. The calculation formulas for calculating the shortest point in each case are, respectively, shown in FIGS. 8A and 8B. Further, the shortest distance len can be calculated in accordance with the following formula:

$$len = \sqrt{(xx - carX)^2 + (yy - carY)^2}$$

At the step S13, whether or not the shortest distance len from the cursor SC is smaller than the value stored in the register minLen is judged. Here, if the shortest distance len calculated this time is smaller than the shortest distance previously obtained, the flow advances to the step S14, and the content of each register is updated. If it is greater, the flow advances to the step S15 while skipping the step S14.

At the step S14, the shortest distance len obtained this time is stored in the register minLen, and the coordinates (xx) and (yy) of the shortest distance H are stored in the registers minx and minY. The number i of the link at this time is also stored in the register minNum.

At the step S15, +1 is added to the content of the register i, and the flow then advances to the step S16. Consequently, judgement of the next link is effected at the steps after the step S12 in the next processing.

At the step S16, whether or not the link of this time is the last link is judged, and if it is not, the flow returns back to the step S11. When calculation of all the links is completed, the flow advances to the step S17.

As a result of the processings up to the step S16 described above, the shortest distance len is set to the register minLen, the number of the link of the shortest distance point is set to the register minNum, and the coordinates of the start point of the link are set to the registers minx and minY, respectively.

At the step S17, whether or not the value of the register minLen is smaller than a predetermined value AREA-MAX is judged. If the result is Yes, the flow advances to the steps S19 et seq, and the processing for setting the shortest point to the start point of driving simulation is executed. If the result is No, the flow advances to the steps S18 et seq, and the processing for setting the shortest point to the point at which simulation is previously interrupted or to the start point of all the routes is executed.

At the step S19, the pitch of position updating in driving simulation is set in accordance with the reduced scale of the map.

This setting of the pitch will be hereby explained. A map having a hierachical structure including a map of a broad area such as a nation-wide map and a detailed map such as a town map of Kobe City, for example, is used as the map for the navigation apparatus, and this map has different reduced scales. If the updating distance of simulation is fixed as in the prior art apparatuses, the scrolling speed of the screen becomes different with each map when the maps having different reduced scales are displayed on the display unit 28. Particularly when long distance retrieval is conducted, an excessively long time is necessary from the start to the goal.

Figure 9:
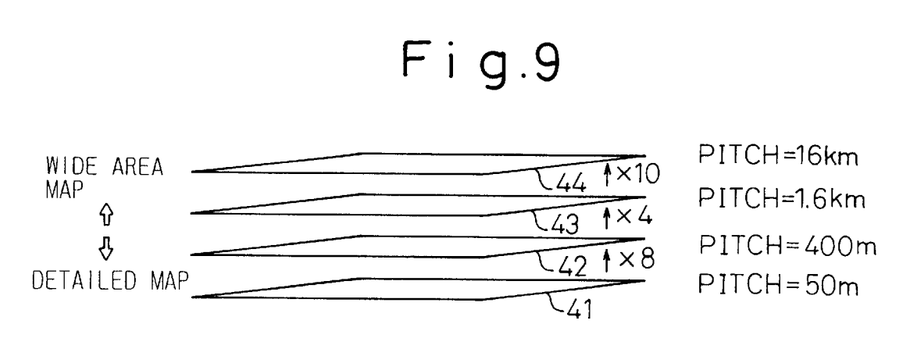
FIG. 9 is a diagram showing the relation between the reduced scale of a map and a pitch in the processing shown in FIGS. 6 and 7.

In contrast, when the maps 41 to 44 having the hierachical structure having different reduced scales exit as shown in FIG. 9, the pitch is reduced so as to shorten the updating distance when the detailed map 41 is displayed, and is elongated so as to elongate the updating distance when the broad area map 44 is displayed, in accordance with the reduced scale of each map. In this way, the scrolling speed on the screen when simulation is made becomes constant even when the reduced scales of the maps are different, and simulation can be executed at an optimum tracing speed from the detailed map 41 to the broad area map 44.

At the subsequent step S20, the distance len 2 between the coordinates (sx, sy) of the start point of the link having the number stored in the register minNum and the shortest distance point H represented by the registers minX and minY.

At the step S21, the number of the register minNum is set to the register startNum representing the start point of simulation, the division number j (=len 2/PITCH) is calculated, and the processing is completed. The division number j of the link will be described later.

At the step S18, whether or not simulation is previously made is judged. If the result proves Yes, the processing is as such completed. If simulation is previously made, the value stored in the register startNum represents the number of the interruption point in previous simulation. Therefore, the simulation start point is set to the interruption point without making any setting at all at the steps after the step S18.

If the result is No at the step S18, the register startNum for storing the start point is reset by 0, and 0 is set to the division number j of the link. In this way, the cursor is set independently of the route, and if simulation is not previously made, the start point becomes the start point of all the routes.

When the start point of simulation is set by the processings shown in FIGS. 6 and 7, the start command is inputted from the inputting unit 24. Then, simulation is started, and position updating is conducted by the flowchart shown in FIGS. 10 and 11, and scroll of the screen of the display unit 28 is made.

Figure 10:
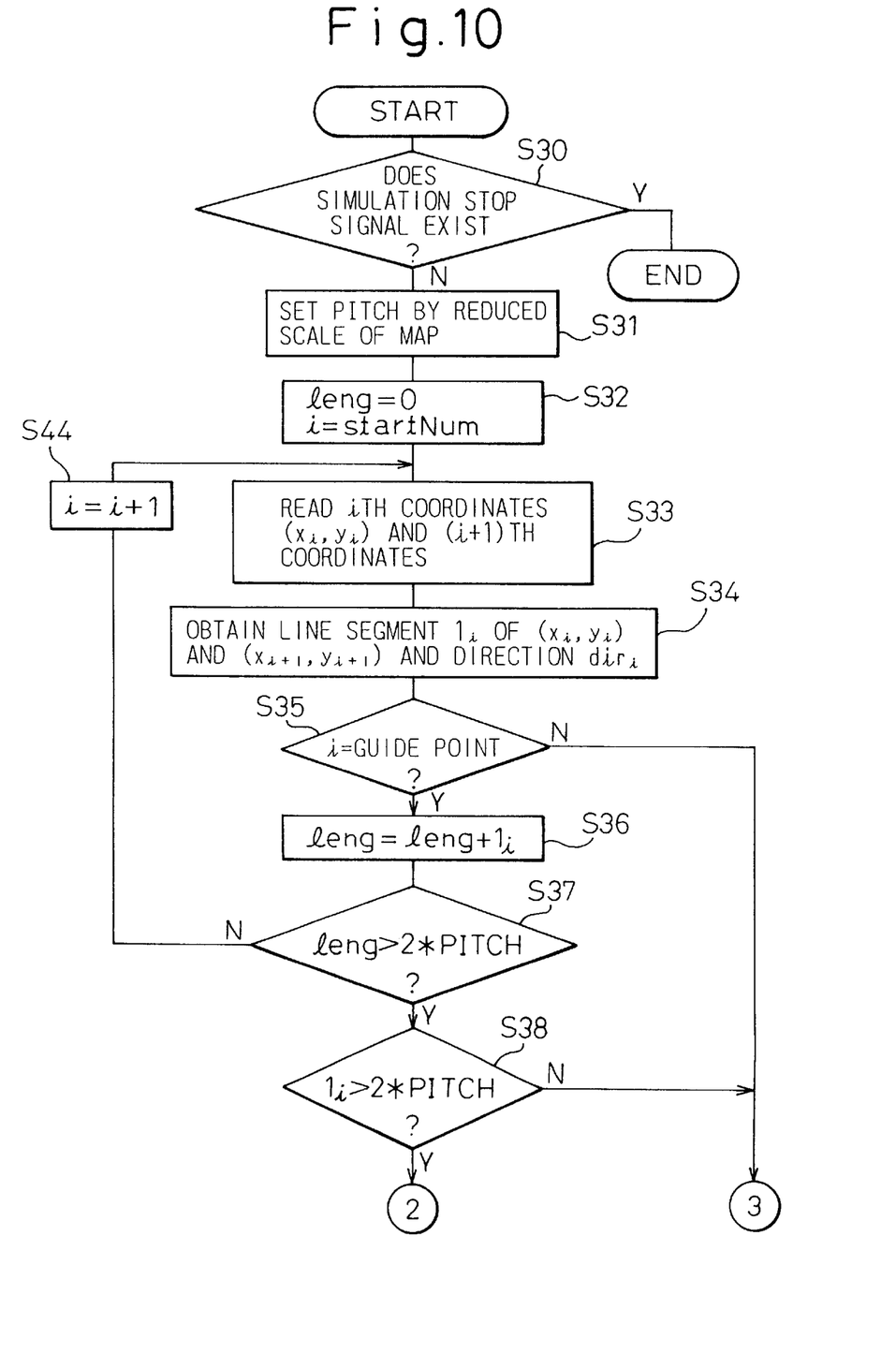
FIGS. 10 and 11 are flowcharts that together explain the processing of route updating in the driving simulation apparatus according to the present invention.
Figure 11:
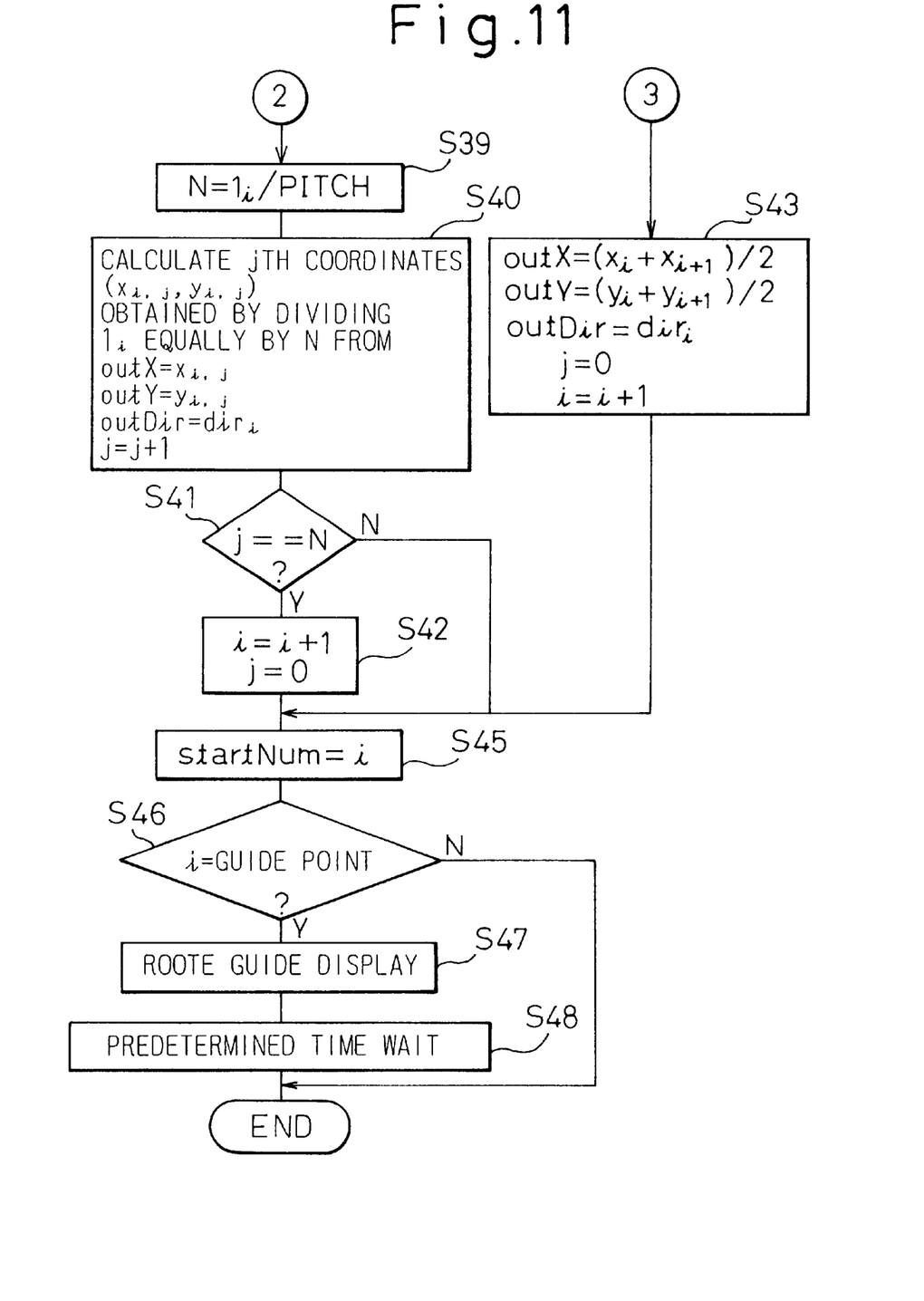

The processing shown in FIGS. 10 and 11 is started at a predetermined time interval.

At the step S30, whether or not the driving simulation stop signal is inputted from the inputting unit 24 is judged. If this signal is not inputted, the flow advances to the step S31. If this signal is inputted, this processing is stopped.

At the step S31, setting of PITCH is conducted in accordance with the reduced scale of the map. The reason why this pitch is set has already been explained with reference to the step S19 shown in FIG. 7.

At the step S32, 0 is set to the register leng as initial setting, and the value of startNum obtained by the processing shown in FIGS. 6 and 7 is set to the register i.

At the step S33, the coordinates of the start point of the link having the number stored in the register i are set to $(x_i, y_i)$, and the coordinates of the start point of the subsequent i+1th link are set to $(x_{i+1}, y_{i+1})$, and these coordinates are then read.

At the step S34, the line segment $1_i$ between the coordinates $(x_i, y_i)$ and the coordinates $(x_{i+1}, y_{i+1})$ and its direction $dir_i$ are calculated.

At the step S35, whether or not the ith route is the guide point (for example, crossing) is judged with reference to the data shown in FIG. 5. If the result is Yes, the flow advances to the step S36 and if it is No, the flow advances to the step S43.

At the step S36, the line segment $1_i$ obtained at the step S34 is added to the content of the register leng. At the next step S37, whether or not the value of the register leng is greater than twice of the pitch PITCH is judged. If the result is No, 1 is added to the register i at the step S44 and then the flow returns to the step S33. If the result is Yes, the flow advances to the step S38.

At the step S38, whether or not the line segment $1_i$ obtained at the step S33 is greater than twice the pitch PITCH is judged. If the result is No, the flow advances to the step S43, and if it is Yes, the flow advances to the step S39.

Figure 12:
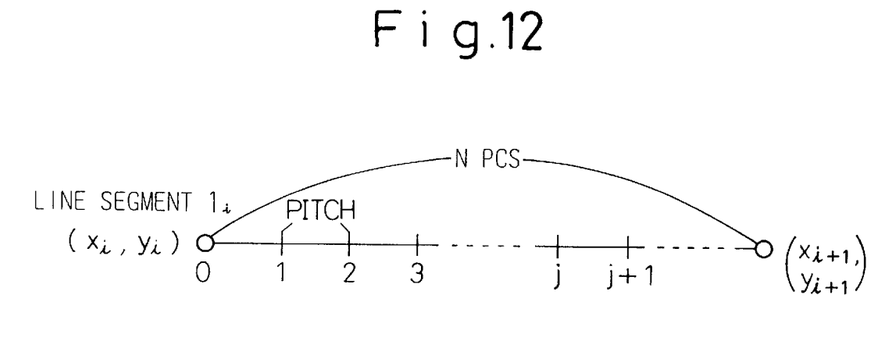
FIG. 12 is an explanatory view useful for explaining a division method of a route link in the processing shown in FIGS. 10 and 11.

At the step S39, the line segment $1_i$ is divided by the pitch PITCH. The result of this division is shown in FIG. 12. The line segment $1_i$ connects the coordinates $(x_i, y_i)$ of the start point of the ith line to the coordinates $(x_{i+1}, y_{i+1})$ of the start point of the subsequent link, and among the points divided by the pitch PITCH, the jth coordinates are expressed by $(x_{i,j}, Y_{i,j})$.

At the step S40, $(x_{i,j})$, $(y_{i,j})$ and $dir_i$ are set to the register outX, the register outY and the register outDir, respectively, on the basis of the jth coordinates $(x_{i,j}, y_{i,j})$ among the coordinates of each point obtained by equally dividing the line segment $1_i$ by N.

The simulation driving coordinate generating unit 33 updates the route position on the basis of these outX, outY and outDir.

Whether or not the value of the register j reaches the division number N is judged at the step S41. If the result is No, the flow advances to the step S45. If the result is Yes, the flow advances to the step S42, where 1 is added to the content of the register i, the register j is reset to 0, and then the flow advances to the step S45. The value of the register i is set to the register startNum at this step S45.

When the distance of the link is greater than PITCH×2 by the processing described above, the link is divided into N as shown in FIG. 12, the route position updating is effected for each pitch, and the screen of the display unit 28 is serially scrolled. Therefore, the scrolling speed can be made constant irrespective of the length of the link.

When this ith route is judged as not being the guide point at the step S35, and when the distance of the link is judged as not being greater than the twice the pitch PITCH at the step S38, the values $[(x_i)+(x_{i+1})]/2$, $[(y_i)+(y_{i+1})]/2$ and $dir_i$ are set to the register outx, the register outY and the register outDir, respectively, at the step S43, 0 is set to the register j, and 1 is added to the content of the register i. At the step S45, the value of the register i is set to the register startNum.

The processing described above, which passes through the step S43, updates the route position so that the cursor SC is positioned at an intermediate point of the next point when the passing node does not include the guide point and when the length of the link is small even when the passing node includes the guide point, and the screen of the display unit 28 is scrolled.

At the step S46, whether or not the ith route is the guide point is judged. If the result is No, the processing is completed, and if the result is Yes, the route guide display is displayed on the display unit 33 at the step S47, and the passage of a predetermined time is awaited at the step S48. In this way, the route guide display is continuously displayed for a predetermined time, and the user can more easily watch the screen.

The processing in FIGS. 10 and 11 explained above is started in every predetermined time interval, and the screen of the display unit 28 is scrolled at a predetermined pitch.

Since scrolling is stopped while the stop signal is inputted from the inputting unit 24 at the afore-mentioned step S30, the same screen can be continuously displayed at an arbitrary timing on the display unit 28.

Next, when the cursor SC comes near to the guide point, the route guiding unit 34 executes the net guide.

Figure 13:
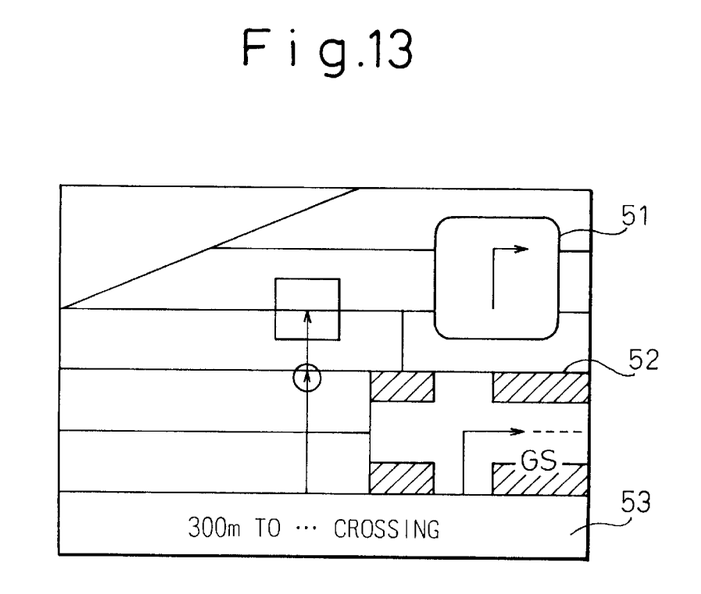
FIG. 13 shows a screen of a display unit at a guide point.

First, the speech output unit 26 outputs a chime sound "PUOOON" and then outputs the speech "Turn to the right about 300 m ahead". Next, a guide sign 51 is displayed as shown in FIG. 13, a crossing enlarged view 52 with a landmark is displayed and then a distance display 53 to the guide point is displayed.

Figure 14A:
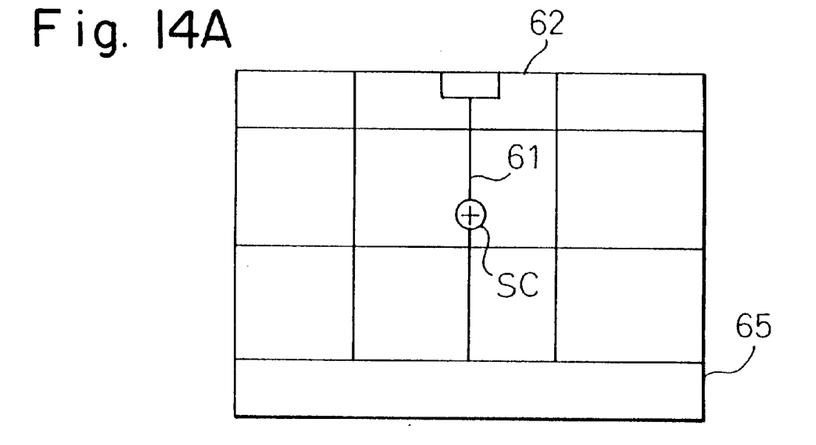
FIGS. 14A–14C shows a screen of a display unit when simulation is executed.
Figure 14B:
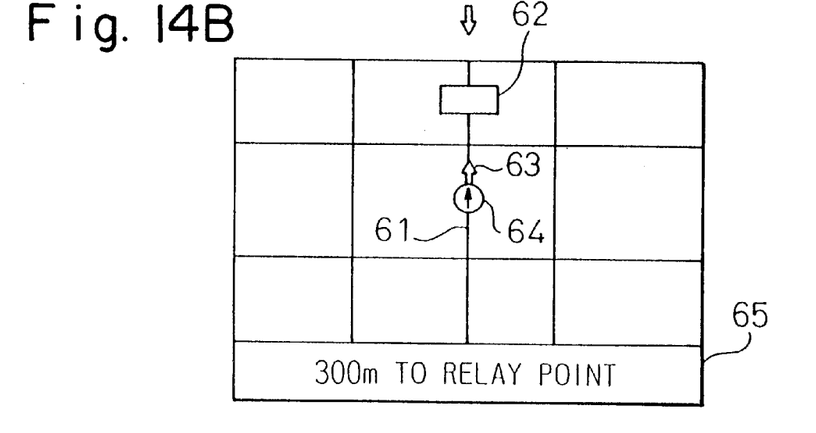
Figure 14C:
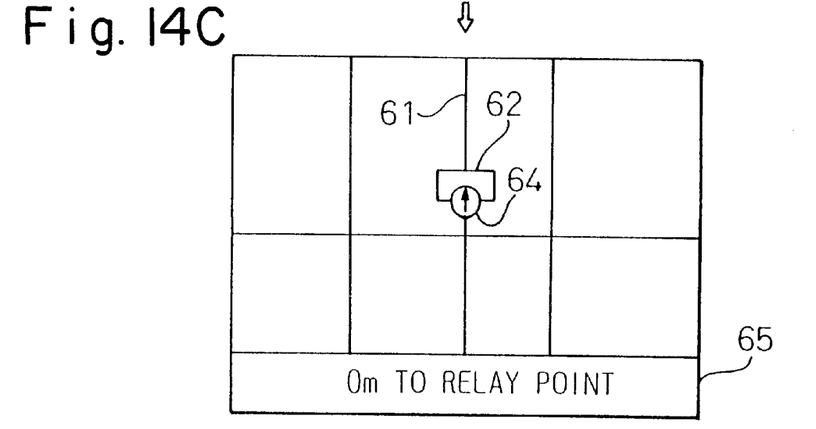

FIGS. 14A–14C show the screen of the display unit 28 when driving simulation is executed. FIG. 14A shows the state where the cursor SC, before the start of simulation, is put on the route 61. By the way, reference numeral 62 denotes the relay point. When the start button of the input unit 24 is pushed under this state, the cursor SC changes to a car mark 63 as shown in FIG. 14B, and an arrow 64 representing the driving direction is displayed. The screen is then scrolled, the relay point gradually approaches to the car mark 62, and a display reading "300 m to the relay point" is displayed at the lower portion 65 of the screen.

The screen is further scrolled and when the mark 63 comes near to the relay point, a display reading "0 m to the relay point" is displayed at the lower portion 65 of the screen, as shown in FIG. 14C.

According to the present invention, it is possible to obtain a driving simulation apparatus capable of starting simulation from an arbitrary point.

I claim:

1. A driving simulation apparatus, comprising:
   means for retrieving a route on a map, on the basis of digital map data representing the map and obtained by digitizing a road network, by inputting a starting point and a destination point of the route relative to the map;
   means for displaying the retrieved route relative to the map on a display unit;
   means for calculating a position on the route which is at a shortest distance from an arbitrary position of a scroll cursor on the display unit;
   means for setting the calculated position on the route as a start position of a driving simulation; and
   means for executing said driving simulation by tracing the displayed route and scrolling the map.

2. A driving simulation apparatus according to claim 1, further comprising means for setting the speed of said scroll cursor in accordance with a reduced scale on a display map.

3. A driving simulation apparatus according to claim 1, further comprising means for stopping the scroll of said map halfway in the driving simulation in accordance with an input signal.

4. A driving simulation apparatus according to claim 1 wherein the means for calculating outputs a calculated shortest distance value, the driving simulation apparatus further comprising:
   means for setting an interruption position of a previous simulation to the start position of the current driving simulation when the calculated shortest distance value exceeds a predetermined value.

5. A driving simulation apparatus according to claim 1 wherein the means for calculating outputs a calculated shortest distance value, the driving simulation apparatus further comprising:
   means for setting the starting point for the route to the start position of the driving simulation when the calculated shortest distance value exceeds a predetermined value.

6. A driving simulation apparatus according to claim 1, wherein said map having a hierarchical structure includes different reduced scales.

7. A driving simulation method, comprising the steps of:
   retrieving a route on a map, on the basis of digital data representing the map and obtained by digitizing a road network by inputting a starting point and a destination point of the route relative to the map;
   displaying the retrieved route relative to the map on a display unit;
   moving a scroll cursor to an arbitrary position on the display unit while displaying the retrieved route thereon;
   calculating a position on said route which is at a shortest distance from the arbitrary position of said scroll cursor on said display unit;
   setting the calculated position on said route as a start position of a driving simulation; and
   thereafter, executing simulation driving by tracing said displayed route from the start position and scrolling said map.

8. A driving simulation apparatus for retrieving a route and displaying the route relative to a map on a display, comprising:
   a first unit executing simulated driving by tracing the displayed route while scrolling the map;
   a second unit calculating a position on said route which is at a shortest distance from an arbitrary position of a scroll cursor on the display, to which arbitrary position the scroll cursor is moved after an interruption of the tracing of the displayed route; and
   a third unit setting the calculated position on the route as a start position of an interrupted driving simulation.

9. A driving simulation method for retrieving a route and displaying the route relative to a map on a display, comprising:
   executing simulated driving by tracing the displayed route while scrolling the map;
   calculating a position on said route which is at a shortest distance from an arbitrary position of a scroll cursor on the display, to which arbitrary position the scroll cursor is moved after an interruption of the tracing of the displayed route; and
   setting the calculated position on the route as a start position of an interrupted driving simulation.

* * * * *